Dec. 7, 1965    T. KOSA ETAL    3,221,560
FLOWABILITY APPARATUS

Filed Feb. 21, 1963    3 Sheets-Sheet 1

INVENTORS
Tibor Kosa,
Frank R. Agasie
BY George W. Porter
ATTORNEY

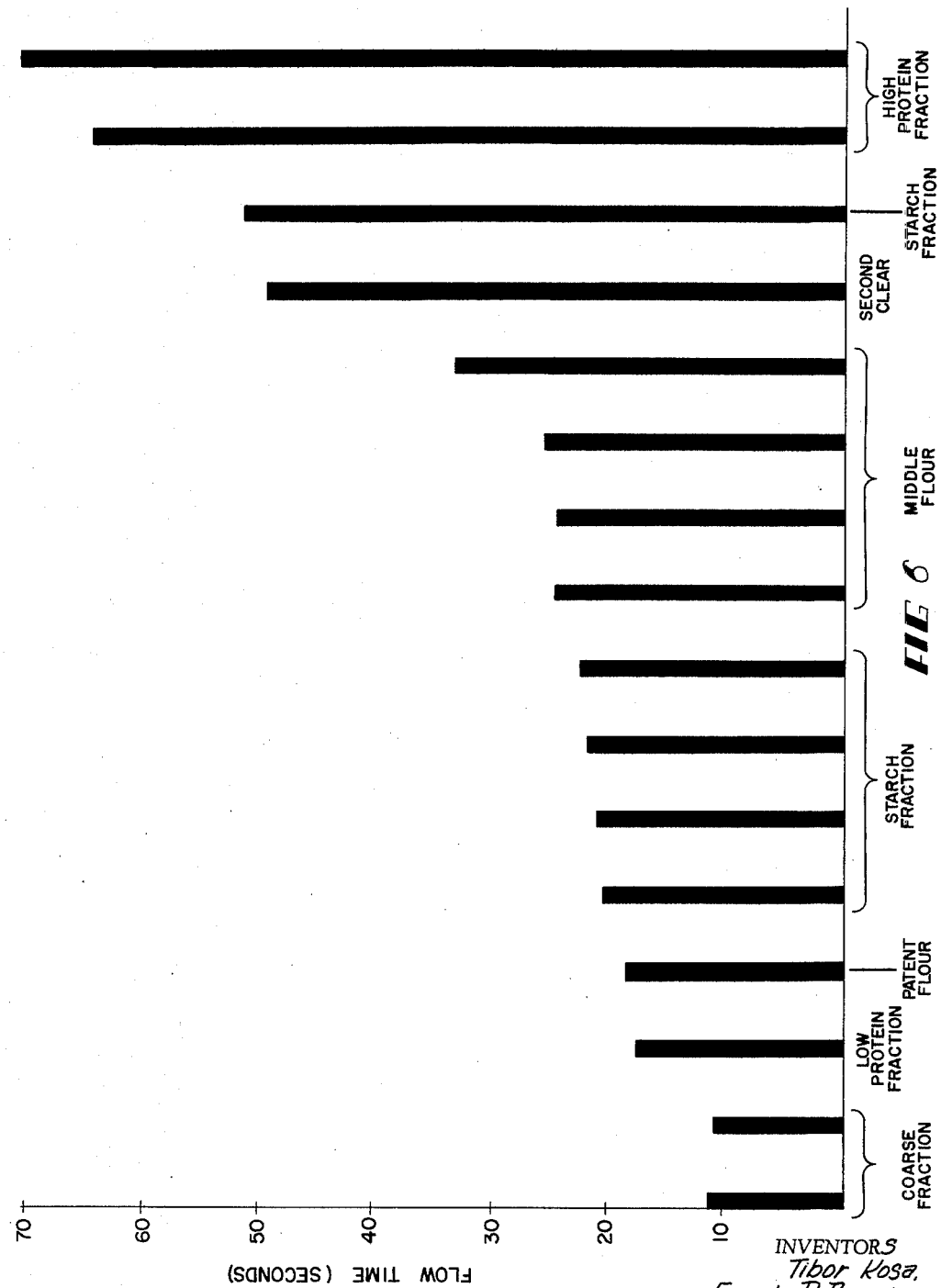

United States Patent Office 3,221,560
Patented Dec. 7, 1965

---

3,221,560
FLOWABILITY APPARATUS
Tibor Kosa and Frank R. Agasie, Minneapolis, Minn., assignors to The Pillsbury Company, Minneapolis, Minn., a corporation of Delaware
Filed Feb. 21, 1963, Ser. No. 260,154
8 Claims. (Cl. 73—432)

This invention relates to a method and apparatus for measuring the relative flowability of powdered or granular materials such as flour, starch, calcium carbonate, tricalcium phosphate, sodium acid pyrophosphate, sugar, sand, cement, resins, calcium sulfate pigments, metal powders, pulverized plastics, talc, glass beads, etc. Flowability implies freedom of motion among the particles of a substance in contact with each other and in contact with a surface. By the invention herein described, relative flowability is measured in time by placing a known quantity of material in a container, passing the material out of the container through a screen covering its lower orifice and measuring the time required. The passage is stimulated by vibrating the container and screen and may be agitated by rigid spheres resting against the screen. The time required for passage provides an index of relative flowability. All such indices might ideally be related to the index obtained for a standard material under standard conditions.

Presently there is no known satisfactory method for measuring the relative flowability of powdered materials. There is a need, however, for some reliable method of determining the relative flowability of materials having different physical characteristics as well as the relative flowability of like materials under varying physical conditions. Different physical characteristics might include particle shape, size, size distribution. Varying physical conditions might be temperature, moisture content, or percentage of additives such as silicon dioxide (Santocel) or tricalcium phosphate. Santocel is the trade name of a substance comprising essentially silicon dioxide manufactured by the Monsanto Chemical Company. Many methods of production require a continuously flowing supply of powdered or granular materials. This invention provides a method and apparatus for determining the relative flowability of such materials.

The invention has among its objectives:

To provide a method and apparatus for determining the relative flowability of powdered or granular materials having different physical characteristics.

To provide a method and apparatus for determining the relative flowability of powdered or granular material under varying physical conditions.

To provide apparatus comprising a rigid container, a screen, a rigid sphere, a well-controlled vibrating means and a timer for determining the relative flowability of various powdered or granular materials.

To provide a method capable of use on a small quantity of powdered or granular material to obtain flowability indices for predicting relative flowability of large quantities used in continuous production.

Other objectives may appear in the drawings and detailed description which follows. Reference is made to the accompanying drawings showing the preferred embodiment of the invention.

FIGURE 6 is a bar graph showing the flow time (in seconds) for various flours tested using the apparatus and method herein described.

Figure 1:
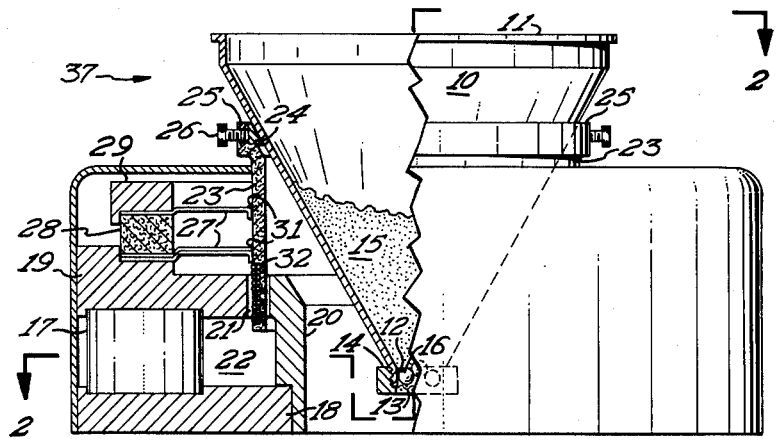
FIGURE 1 is a side view of the vibrator with a portion of the left side cut away.
Figure 2:
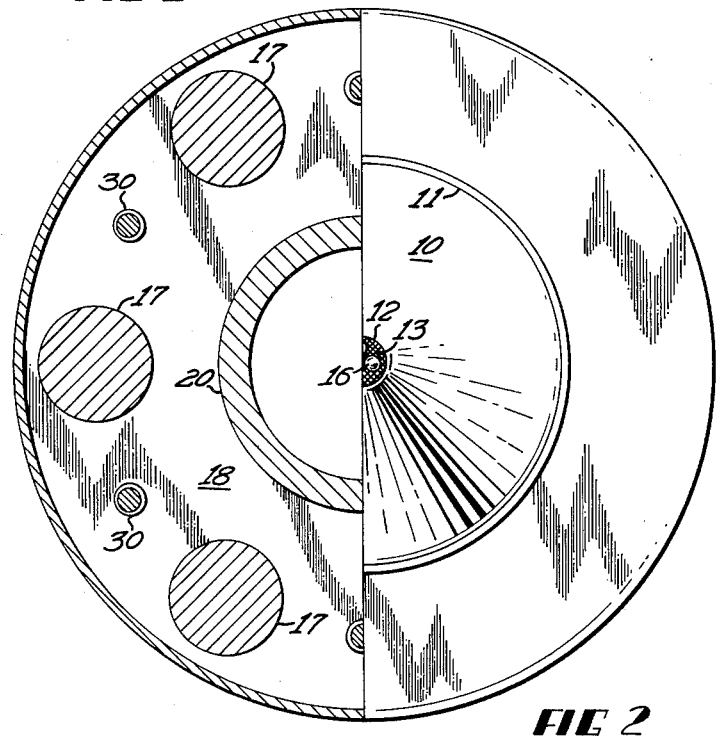
FIGURE 2 is a sectional top view taken along the line 2—2 in FIGURE 1.

The preferred embodiment of the invention appears in FIGURES 1 and 2. It includes a rigid container which may take the form of a stemless funnel 10. The container need not necessarily be a frustrum of a cone. It may, for example, be cylindrical or rectangular. The container must, however, be rigid so that it is capable of being vibrated without deformation and it must have an upper and lower orifice with the sides sloping regularly to the lower orifice so that it may be gravity fed when vibrated. The container may consist of a metal alloy, wood, glass or plastic, or any other substance which imparts rigidity and smoothness. In the preferred embodiment, the funnel 10 consists of 22 gauge aluminum having an upper orifice 11 with an outside diameter of about 3¾ inches, a lower orifice 12 with an outside diameter of about ½ inch, and a height of about 3 inches.

Screening means placed over the lower orifice 12 may take the form of wire mesh 13. For allowing quick change of mesh size and for ease of construction, the wire mesh 13 may extend across the opening of a threaded ring 14, which is screwed onto the outside of the lower orifice 12.

The openings in the wire mesh must be substantially greater in size than the largest particles forming the powdered or granular material 15. The passage of material through the screen must not be a sieving operation, i.e., the screen must not allow only the passage of substantially individual particles. To avoid the sieving effect when wheat flour is tested, the size of the screen openings should be greater than 149 microns (U.S. No. 100 mesh).

Although the screen openings must be substantially larger than the particle size of the material 15, they must not be so large that the material flows freely therethrough without vibration of the container and screen. Successful operation of the invention requires that prior to the beginning of vibration, the material 15 remain at rest in the container in contact with the screen over the lower orifice without flowing through it. To prevent free flow when wheat flour is tested, the screen openings should be smaller than U.S. No. 6 mesh.

Although a wire mesh 13 is shown in the preferred embodiment of the invention, the screening means may take other forms. For example, a rigid metal plate having a plurality of circular, rectangular or triangular openings might be used. Grates formed by crossing a plurality of wires or rods might be used. In the preferred embodiment shown in FIGURE 1, the screening means consists of U.S. No. 8 wire mesh.

Rigid spheres 16 may be placed in the container to rest against the screening means and function as agitators.

When the relative flowability of finer material is being measured, they are necessary to prevent clogging of the screen and insure continuous flow of material at a substantially constant rate. The spheres may be of any substance which imparts rigidity and has a specific gravity in excess of that of the powdered material. All metal alloys meet this requirement. Other substances, however, such as glass, plastic or wood, might be used. The size and number of the spheres may vary. They must be of a diameter greater than the minimum dimension of the screen openings so that they do not fall through, but less than the diameter of the lower orifice 12. One, two, three or more spheres may be used. In the preferred embodiment, two stainless steel, ¼ inch spheres were used. When coarse or granular materials are being measured for relative flowability, the spheres may be omitted.

The container and screen may be vibrated using any means that avoids uncontrolled vibration and produces consistent reproducibile movement. The vibrating means used in the preferred embodiment appears in FIGURE 1. It includes six cylindrical permanent magnets 17 hexagonally spaced on a circular mild-steel magnet cradle 18. The magnets are covered above by mild-steel magnet cradle 19 and around their sides nearest the interior of the hexagon by mild-steel magnet carrier 20 leaving a cylindrical gap 21 between them and another gap 22 below. A rigid fibrous cylindrical vibrating element 23 extends from the gap 22 vertically through the cylindrical gap 21 until in contacts the funnel 10 at the funnel holding ridge 24 which is secured to the funnel. The funnel holding ridge 24 nests in the top 25 of the cylindrical vibrating element 23 and is secured in place by tightening the four funnel holding bolts 26.

An important advantage of this design is that the measuring device itself, the container with the screen, is mounted directly on the vibrating element of the vibrator without any intermediate parts. In this way the uncontrolled vibrations are kept down to the minimum. In the reduction to practice of the invention, different types of mounting of the container on the vibrating element were tried. An attempt was made to use an upstanding "U-shaped" support for the container and screen. This design did not allow controlled vibration because the substantially vertical vibration of the element lead to different uncontrolled vibration of the upstanding arms, and subsequent fatigue failue occurred.

The vibrating element and funnel are supported at rest by two spaced, flexible, textile, Bakelite spiders 27; horizontally positioned and held at their outside circumference between the upper magnet cradle 19 and tightener ring 29 and spaced by fibrous spacer 28. Although textile, Bakelite spiders were used in the preferred embodiment, metal spiders might be used. The whole assembly is secured by means of six tightener bolts 30 passing in order through the tightener ring 29, one spider 27, the fibrous spacer 28, the other spider 27, the upper magnet cradle 19 and the lower magnet cradle 18. The two spiders 27 are attached on their inside circumference to the cylindrical vibrating element 23 by means of an adhesive 31 so that the vibrating element is held vertically at rest with its lower portion extending through the gap 21.

A driver coil 32 is wound around the lower portion of the vibrating element 23 that extends through the gap 21. The coil is recessed on the vibrating element 23 for substantially the length of the gap. The coil consists of about 25 turns of No. 28 copper wire in two layers. To prevent overtravel and insure sinusoidal vibration, the coil may be wound as described in U.S. Patent No. 2,781,461.

Figure 3:
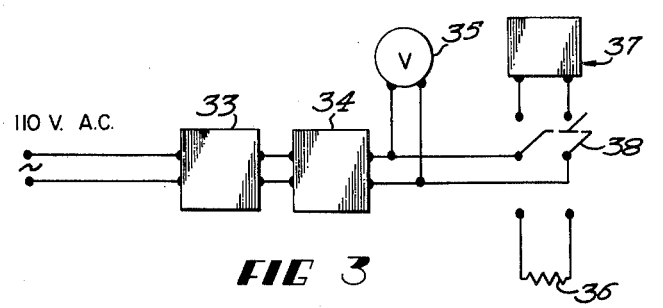
FIGURE 3 is a block diagram showing the elements and electrical wiring of the vibrating system employed in the preferred embodiment of the invention.

The vibrator is operated by a special power source connected to the line voltage as shown in FIGURE 3. The frequency and voltage are stabilized by means of the stabilized oscillator 33 and stabilized power amplifier 34 respectively. The amplitude, a function of the voltage, is, therefore, also stabilized. The magnitude of the output voltage (and as a result, the amplitude of vibration) is measurable by the voltmeter 35 and controlled by adjusting the output of the power amplifier. Therefore, voltage is stabilized, measurable and adjustable at the point of input to the vibrator. The frequency is stabilized and adjustable at the oscillator. One lead from the stabilized amplifier 34 connects to one end of the driver coil 32, the other lead connects to the other end. Double pole double throw switch 38 lies intermediate the power source and the vibrator 37 and is capable of carrying the power to the vibrator 37 or to dummy load 36 when no vibration is desired. The oscillator, amplifier, voltmeter and vibrator may be combined into one physical unit.

The six permanent magnets 17 cause the air gap 21 to be an area of high magnetic flux density. The number of magnets is not critical. The magnetic flux is carried through and about the permanent magnets in the field of low reluctance formed by the magnet carrier 20 and the magnet cradles 18 and 19. The constant magnetic flux crossing the varying magnetic lines of the driver coil produces a force on the vibrating element which varies sinusoidally with time. The magnetic lines of the driver coil vary with the current. Thus the vibrating element is vibrated with constant amplitude and frequency.

In the preferred embodiment shown in FIGURE 1, a constant frequency of 100 cycles per second and a constant amplitude of ¹⁄₆₄ inch was used for measuring the relative flowability of flour. The practical range for operation of the apparatus in connection with vertical vibration of powdered or ganular material is 20–1500 cycles per second and 0.001–0.25 inch amplitude.

To measure the flow time, a known quantity of material 15 is placed in the funnel 10 with the system at rest. Before it is poured into the funnel, however, the wire mesh 13 over the lower orifice 12 must be covered to prevent the passage therethrough of small quantities of the initially entering particles. Without the covering some particles pass through the mesh due to the intertial force developed in pouring. A small piece of masking tape placed over the lower surface of the mesh was used with the preferred embodiment. Other methods such as a sliding valve or swinging gates operated by a solenoid might be used. After the quantity is completely poured into the funnel, the tape is removed. Upon removal, a small quantity of powdered material may pass through the mesh. This may be caught in a container held under the tape during removal and poured back into the funnel. The funnel with its contents is now ready to be vibrated.

The vibrator and a timer are started simultaneously and the material begins flowing through the lower orifice and mesh. The flow is stimulated by the vibration and agitated by the rigid spheres, if used. When the material has completely passed through the lower orifice, the timer is stopped. The moment the funnel empties is quite precise and easily observed.

This procedure may be repeated after making known variations such as quantity of material, percentage of flowing agent added, temperature, moisture content, particle size, type of material, and others. The time required for passage as determined in each test is characteristic of the flowability of the tested material. The flow time is an index of the relative flowability.

The following are examples of the method. In Example 1, six different types of flour were selected. They varied from each other in particle size, particle shape, particle size distribution and moisture content. For each type tested, ten, twenty, thirty, forty and fifty gram quantities were passed through the flowability apparatus. For each type the moisture content was constant in the range of 10 to 13%, and all quantities were at room temperature. The frequency of the vibrator was 100 cycles per second and the vibrator input voltage was 10 volts, resulting in a constant amplitude of vibration of about ¹⁄₆₄ inch. The gram quantities were placed in the flowability apparatus as described above. Results of the tests appear in Table I and graphically in FIGURE 4.

TABLE I

*Comparison of flow time of various quantities of six types of flour*

| Flour Type | Sample Weight (in grams) | Discharge Time Min. | Discharge Time Sec. |
|---|---|---|---|
| XT 8310—Soft Wheat, high protein fraction control | 10 | | 24 |
|  | 20 | 1 | 23 |
|  | 30 | 2 | 20 |
|  | 40 | 3 | 9 |
|  | 50 | 4 | 33 |
|  |  | 5 |  |
| XT 8311—Soft Wheat, agglomerated high protein fraction | 10 | | 11.1 |
|  | 20 | | 22.1 |
|  | 30 | | 33.4 |
|  | 40 | | 44.5 |
|  | 50 | | 54.4 |
| XT 8312—Soft Wheat, agglomerated protein fraction | 10 | | 14.8 |
|  | 20 | | 26.4 |
|  | 30 | | 38.5 |
|  | 40 | | 49.7 |
|  | 50 | | 60.6 |
| XT 8313—Soft Wheat, high protein fraction, agglomerated, low moisture | 10 | | 36.3 |
|  | 20 | | 60.8 |
|  | 30 | 1 | 26.4 |
|  | 40 | 1 | 42.9 |
|  | 50 | 2 | 6.1 |
| XT 8314—Soft Wheat, high protein fraction, agglomerated | 10 | | 28.5 |
|  | 20 | | 52.0 |
|  | 30 | 1 | 10.3 |
|  | 40 | 1 | 25.1 |
|  | 50 | 1 | 48.4 |
| XT 8196—Patent Hard Wheat Flour | 10 | | 21.3 |
|  | 20 | | 30.5 |
|  | 30 | | 49.9 |
|  | 40 | 1 | 7.7 |
|  | 50 | 1 | 22.5 |
| XT 8199-2—Soft Wheat Cake Flour | 10 | | 43.9 |
|  | 20 | 1 | 11.5 |
|  | 30 | 1 | 32.5 |
|  | 40 | 1 | 55.8 |
|  | 50 | 2 | 23.2 |

Figure 4:
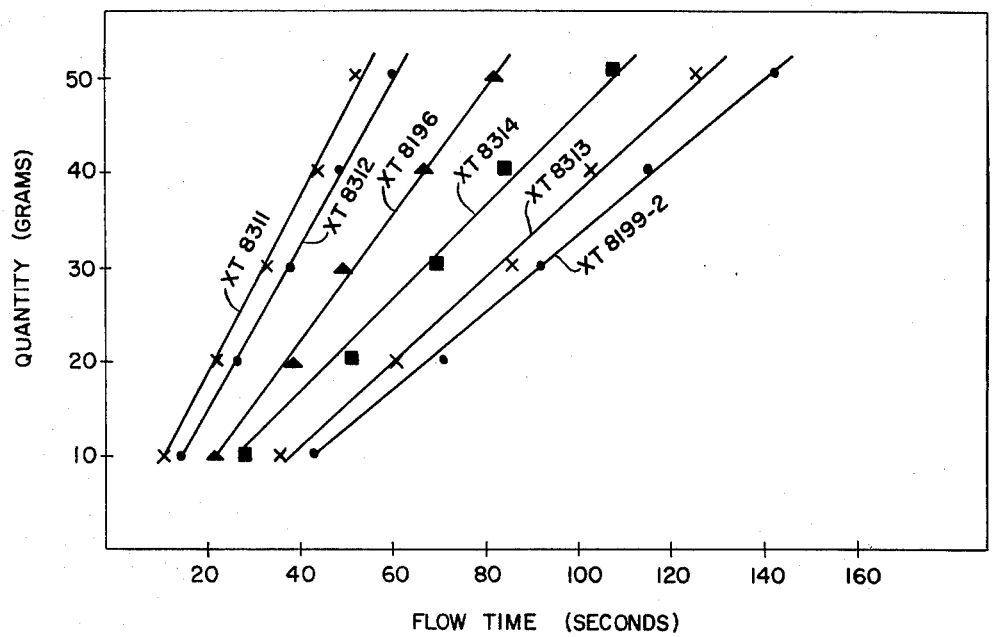
FIGURE 4 is a series of curves showing the relationship between quantity (in grams) of flour and flow time (in seconds) as determined using the invention herein described for various types of flour.

FIGURE 4 indicates that for the range of quantities tested, the flowability index varies in direct proportion to the quantity of material passed through the apparatus, or that the rate of passage of material through the apparatus is practically constant, the curves being essentially straight lines.

In Example 2 the method was used to determine the relative effect of varying the percent (by weight) of a flowing agent blended with the flour. Santocel was used as the flowing agent. The total quantity of flour plus Santocel for each percentage of Santocel was 15 grams. The amount of Santocel varied from 0 to 2 percent. For each percentage of Santocel a 15 gram quantity of flour was placed in the apparatus in the manner previously described. The results of that test appear in Table II and graphically in FIGURE 5.

TABLE II

*Relative effect of the addition of Santocel upon flow time of flour*

| Percent of Santocel | Flow time, seconds |
|---|---|
| 0 | 21.6 |
| 0.1 | 13.6 |
| 0.5 | 9.6 |
| 1.0 | 7.0 |
| 2.0 | 5.9 |

Figure 5:
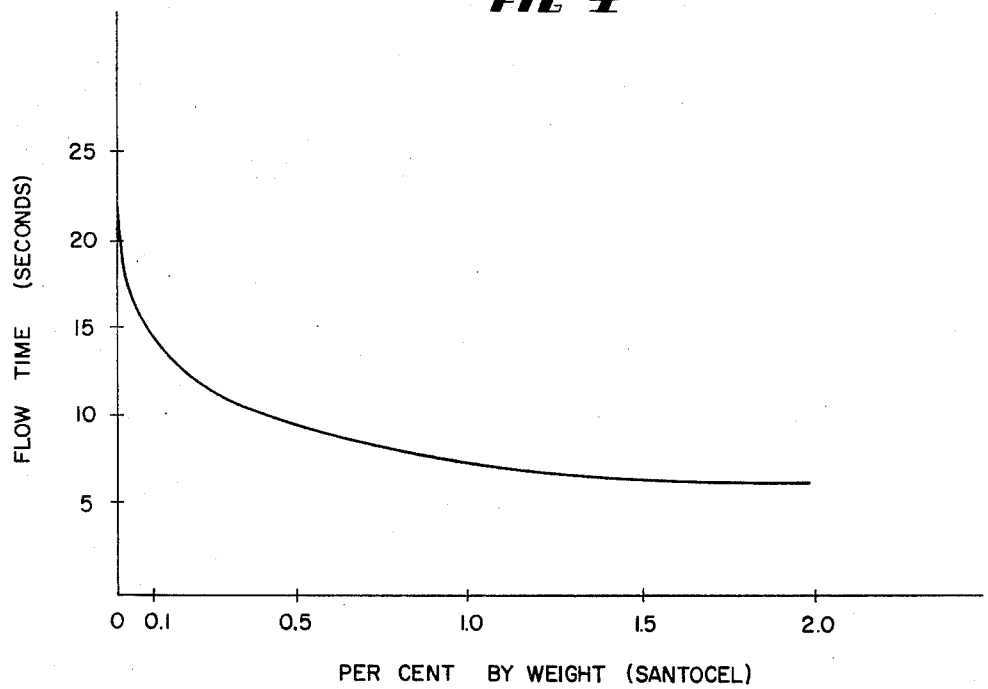
FIGURE 5 is a representative curve showing the relationship between flow time (in seconds) and percentage (by weight) of Santocel blended in wheat flour as determined by the invention herein described.

FIGURE 5 indicates that the relative flowability of the flour varies roughly hyperbolically with the increase of Santocel.

In Example 3 the method was used to determine the relative flowability of various types of flour produced commercially from hard winter wheat. The types varied from each other in particle size, particle shape, particle size distribution, and ash, protein and moisture content. Fifteen gram samples were used. Three rigid spheres were used as agitators. The results appear graphically in FIGURE 6. They correlate with the flow properties of various flours as generally observed in the mill.

We claim:

1. Apparatus for determining the relative flowability of powdered or granular material which comprises,
    (a) a rigid vertically disposed container having an upper and lower orifice with sides sloping regular to said lower orifice,
    (b) screening means over said lower orifice having openings whose minimum dimension is greater than the maximum dimension of the particles from said material, but not so great that said material flows freely through said screening means without vibration of said funnel and screening means,
    (c) means for imparting a controlled vertical vibration to said funnel and screening means which comprises:
        (1) a rigid upstanding cylindrical vibrating element having an upper horizontal edge and a lower horizontal edge, said element being secured to said container at said upper horizontal edge and said container being nested within said element above said lower horizontal edge, and
        (2) means for vertically vibrating said cylindrical element with constant amplitude and frequency.

2. The apparatus of claim 1 wherein the height of said cylindrical vibrating element is less than the distance from said upper to said lower orifice.

3. The apparatus of claim 2 wherein said means for vertically vibrating said cylindrical element includes the application of force of equal magnitude and direction at a plurality of points spaced uniformly around said lower horizontal edge.

4. The apparatus of claim 2 wherein said means for vertically vibrating said cylindrical vibrating element comprises,
    (a) means for supporting said element at rest and for preventing horizontal movement when vibrated,
    (b) a coil wound circumferentially around said vibrating element near said lower horizontal edge and
    (c) a plurality of fields of constant magnetic flux crossing said coil at a plurality of points spaced uniformly on the circumference of said coil.

5. Apparatus for determining the relative flowability of powdered or granular material which comprises,
    (a) a rigid vertically disposed funnel having an upper orifice and a smaller lower orifice,
    (b) screening means over said lower orifice having openings whose minimum dimension is greater than the maximum dimension of the particles from said material, but not so great that said material flows freely through said screening means without vibration of said funnel and screening means,
    (c) means for imparting a controlled vertical vibration to said funnel and screening means which includes:
        (1) a rigid upstanding cylindrical vibrating element having an upper horizontal edge and a lower horizontal edge, and an inside diameter greater than the diameter of said lower orifice but less than the diameter of said upper orifice, said upper horizontal edge of said element being secured to said funnel with said funnel being nested in said element,
        (2) means for vertically vibrating said cylindrical element with constant amplitude and frequency.

6. The apparatus of claim 5 wherein the height of said cylindrical vibrating element is less than the distance from said upper to said lower orifice.

7. The apparatus of claim 6 wherein said means for vertically vibrating said cylindrical element includes the application of force of equal magnitude and direction at a plurality of points spaced uniformly around said lower horizontal edge.

8. The apparatus of claim 5 wherein said means for vertically vibrating said cylindrical element comprises,
    (a) means for supporting said element at rest and for preventing horizontal movement when vibrated, (b) a coil wound circumferentially around said vibrating element near said lower horizontal edge and
(c) a plurality of fields of constant magnetic flux crossing said coil at a plurality of points spaced uniformly on the circumference of said coil.

References Cited by the Examiner

UNITED STATES PATENTS

| | | | |
|---|---|---|---|
| 2,274,914 | 3/1942 | Wilcox | 209—347 |
| 2,367,478 | 1/1945 | Wiesbach | 209—346 |
| 2,564,892 | 8/1951 | Gerin | 73—56 |
| 2,583,862 | 1/1952 | Lichtenstein | 209—346 X |
| 2,858,023 | 10/1958 | Holland | 209—381 |
| 3,106,653 | 10/1963 | Fowler | 310—27 |

RICHARD C. QUEISSER, *Primary Examiner.*

JOSEPH P. STRIZAK, *Examiner.*